(12) United States Patent
Thrysoe

(10) Patent No.: US 6,778,554 B2
(45) Date of Patent: *Aug. 17, 2004

(54) INTER-SWITCH LINK HEADER MODIFICATION

(75) Inventor: Christian Thrysoe, Soeborg (DK)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/454,113

(22) Filed: Jun. 3, 2003

(65) Prior Publication Data

US 2003/0198252 A1 Oct. 23, 2003

Related U.S. Application Data

(63) Continuation of application No. 09/276,997, filed on Mar. 26, 1999, now Pat. No. 6,574,238.
(60) Provisional application No. 60/097,892, filed on Aug. 26, 1998.

(51) Int. Cl.$^7$ ................................................. H04J 3/16
(52) U.S. Cl. ........................................................ 370/466
(58) Field of Search ................................. 370/465, 466, 370/395.53, 464, 467, 401, 402, 403, 469, 470, 471, 474, 389, 395.5, 395.51, 395.52

(56) References Cited

U.S. PATENT DOCUMENTS

| | | | |
|---|---|---|---|
| 4,933,937 A | * | 6/1990 | Konishi ........................ 370/404 |
| 5,390,173 A | * | 2/1995 | Spinney et al. ............. 370/393 |
| 5,394,402 A | * | 2/1995 | Ross ........................... 370/402 |
| 5,742,604 A | | 4/1998 | Edsall et al. |
| 5,999,541 A | | 12/1999 | Hinchey et al. |
| 6,035,105 A | | 3/2000 | McCloghrie et al. |
| 6,041,042 A | | 3/2000 | Bussiere |
| 6,175,571 B1 | | 1/2001 | Haddock et al. |
| 6,252,888 B1 | | 6/2001 | Fite et al. |
| 6,272,551 B1 | | 8/2001 | Martin et al. |
| 6,445,715 B1 | | 9/2002 | Annaamalai et al. |
| 6,449,279 B1 | * | 9/2002 | Belser et al. ................ 370/397 |
| 6,553,028 B1 | * | 4/2003 | Tang et al. .................. 370/389 |
| 6,574,238 B1 | * | 6/2003 | Thrysoe ....................... 370/466 |
| 6,674,727 B1 | * | 1/2004 | Carroll et al. ............... 370/254 |

* cited by examiner

Primary Examiner—Dang Ton
Assistant Examiner—Tri H. Phan
(74) Attorney, Agent, or Firm—Fish & Richardson P.C.

(57) ABSTRACT

A method of transmitting data between an interface device and an inter-switch link includes receiving a frame on the inter-switch link and determining whether the frame's payload is an encapsulated frame and forming a modified frame when the frame's payload is an encapsulated frame. The header of the modified frame includes a subset of data from the received frame's header. A link interface device is also featured. The link interface device includes a data transmitting and receiving unit, frame type circuitry, and frame modification circuitry. The data transmitting and receiving unit couples the device to an inter-switch link to transmit and receive data frames on the link. The frame type circuitry can receive data frames from the transmitting and receiving unit and can determine whether a payload segment in the received data frame is an encapsulated frame. The frame modification circuitry is coupled to the frame type circuitry and can modify frame header segment data when the payload segment in the received frame is an encapsulated frame.

26 Claims, 5 Drawing Sheets

INTER-SWITCH LINK HEADER MODIFICATION

CROSS-REFERENCE TO RELATED APPLICATIONS

This application is a continuation application of and claims priority to U.S. application Ser. No. 09/276,997, filed Mar. 26, 1999 now U.S. Pat. No. 6,574,238, which claims priority to U.S. Provisional Application Serial No. 60/097,892, filed Aug. 26, 1998.

BACKGROUND INFORMATION

An inter-switch link (ISL) is a frame-based communications link used to interconnect two or more networking switching devices. Referring to FIG. 1, local area networks (LANs) 101 and 110 can be interconnected using an inter-switch link (ISL) 120 between LAN switching and routing devices 105 and 115. The ISL interconnection 120 interconnects LANs 101 and 110 and allows the nodes 102–103 on the first LAN 101 to exchange data with the nodes 111–113 on the second LAN 110.

An ISL can transport a variety of native frame types between routing and interface devices. Token Ring, Ethernet and other native LAN data frames may be transferred between a pair of gateway switches interconnected by an ISL. To transport a native LAN data frame, the LAN data frame is encapsulated within an ISL frame and transported across the ISL as payload data within the ISL frame. ISL frame header data identifies the type of LAN data frame being transported and may indicate the destination of that frame. A network interface device terminating an ISL link may receive a mix of encapsulated frame types. For example, a network gateway may receive both Ethernet frames and Token Ring frames encapsulated within ISL frames.

SUMMARY

Data frames may be exchanged between local area network switches and computer devices using an inter-switch link. An inter-switch link transfers frames of data that encapsulate native LAN data frames. Inter-switch link frame formats may differ depending on the type of native LAN data frame that is encapsulated. Inter-switch link frame processing efficiency at a receiving or transmitting device may be improved by maintaining consistent inter-switch link frame formats.

In general, in one aspect, the invention features a method of transmitting data between an interface device and an inter-switch link. The method includes receiving a frame on the inter-switch link and determining whether the frame's payload is an encapsulated frame. The method also includes forming a modified frame when the first payload is an encapsulated frame. The modified frame header includes a subset of data from the received frame's header.

In general, in another aspect, the invention features a method of transmitting data between a peripheral bus and an inter-switch link. The method is implemented in an interface device and includes receiving a frame over the peripheral bus, determining whether the frame's payload is an encapsulated frame, and modifying the received frame if the payload is an encapsulated frame. Modified frames are then transmitted on the inter-switch link. Modified frames include a modified header having data from the received frame's header and data from the received frame's trailer.

Implementations may include one or more of the following features. The received and modified frames also may include trailer regions. The trailer of the modified frame may include data from the received frame's header. Frame trailers may include error control data. Forming the modified frame may include calculating error control data. Encapsulated frames may be of more than one frame type. For example, encapsulated frames may be either Token Ring frames or Ethernet frames. Modified frames may be formed for a subset of frame types. The interface device also may transmit modified frames over a peripheral bus using a direct memory access bus transfer.

In general, in another aspect, the invention features a link interface device. The link interface device includes a data transmitting and receiving unit, frame type detection circuitry, and frame modification circuitry. The data transmitting and receiving unit couples the device to an inter-switch link to transmit and receive data frames on the link. The frame type detection circuitry can receive data frames from the transmitting and receiving unit and can determine whether a payload segment in the received data frame is an encapsulated frame. The frame modification circuitry is coupled to the frame type detection circuitry and can modify frame header segment data when the payload segment in the received frame is an encapsulated frame.

Implementations may include one or more of the following features. The device may include bus interface circuitry coupling the device to a peripheral bus over which data frames are transmitted and received. For example, the bus interface circuitry may implement a peripheral component interconnect (PCI) interface to couple the device to a PCI bus. Additionally, the bus interface circuitry may include direct memory access (DMA) circuitry configurable to initiate DMA data transfers to and from the device to a memory region accessible over the bus.

Implementations may provide one or more of the following advantages. Local area network (LAN) protocol processing in computers, network devices, and other data communications devices may be more efficient. A consistent inter-switch link frame format may be provided between a network interface peripheral device and other computer system components with which the device functions. Other advantages will become clear from the drawings, description and the claims that follow.

DETAILED DESCRIPTION

Figure 1:
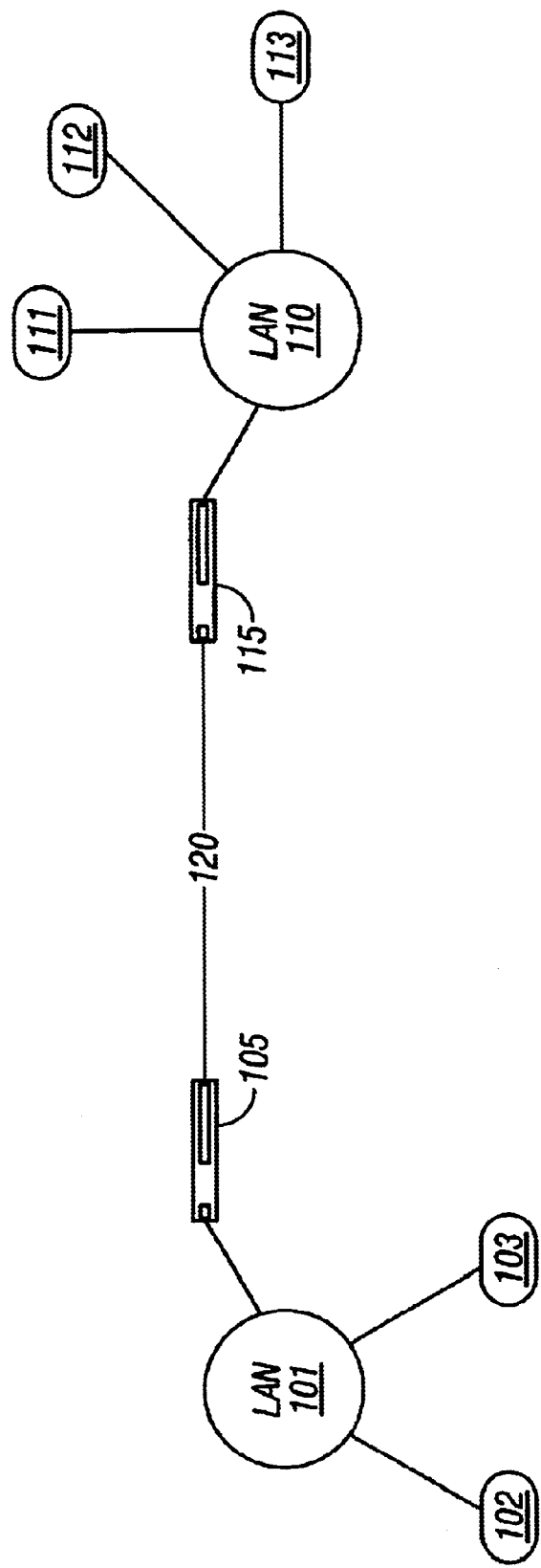
FIG. 1 depicts a Local Area Network.
Figure 2:
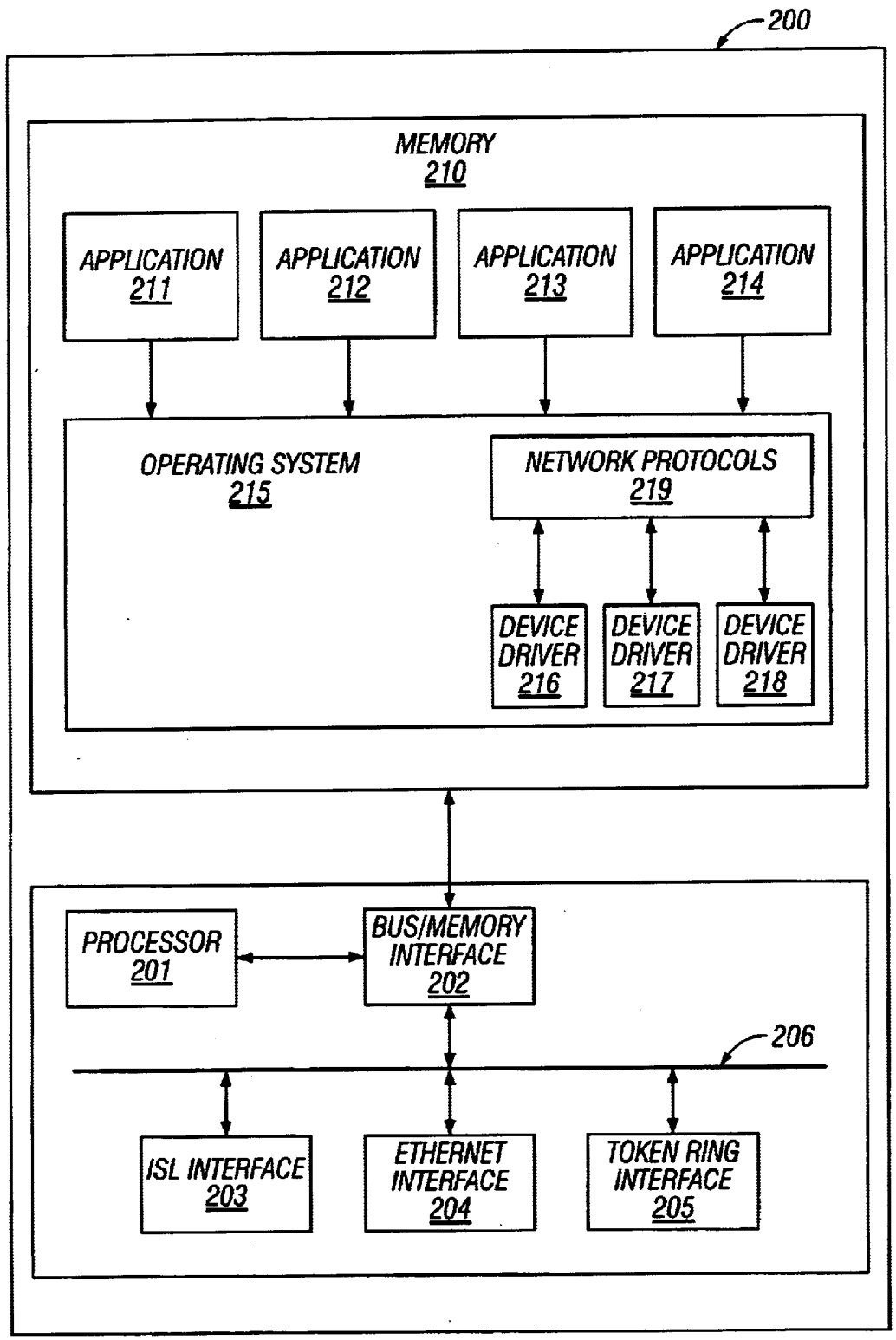
FIG. 2 depicts a computer operating environment.

FIG. 2 shows exemplary hardware and software interfaces within a network element 200 supporting an inter-switch link. The network element 200 includes a collection of physical resources such as a processor 201, a bus/memory interface 202 coupling the processor 201 to a peripheral bus 206 and to memory 210. Additionally, the network element 200 may include peripherals coupled to the bus 206. For example, the network element 200 includes ISL link interface 203, Ethernet interface 204 and Token Ring interface 205 peripherals coupled to a bus 206. The link interface 203 is used to modulate and communicate data over the physical link 120 (FIG. 1) to or from another ISL-capable network element. The interface 203 may send and receive bits over a coaxial cable, a twisted wire interface, a fiber-optic link, a digital cellular radio interface, or other physical interface.

The network element 200 includes an operating system 215. The operating system 215 includes data and instructions that are executed by the processor 201 to control and allocate physical resources such as the ISL and LAN adapters 203–205 and memory 210. The operating system 215 may regulate the use of memory 210 by software applications 211–214. Additionally, the operating system 215 may access physical devices through a set of device drivers 216–218. Device drivers 216–218 provide logical interfaces between the operating system 215 and/or application software 211–214 and peripheral device 203–205 hardware. Thus, the device drivers 216–218 can be used to isolate physical-device dependent programming code from more generalized routines provided by the operating system 215.

In a PC implementation, the network element 200 may be implemented using personal computer hardware components. For example, an Intel(r)×86-based personal computer may be used to implement the device 200. In a peripheral component interconnect (PCI) implementation, the bus 206 is a PCI bus and the link interface 203 as well as LAN interfaces 204–205 can be PCI cards (PCI bus agents). Additional information on PCI buses and bus agents may be found in the *PCI Local Bus Specification Revision* 2.1, published by the PCI Special Interest Group, Portland, Oreg. The network element 200 may include other data bus structures in addition to, or instead of, a PCI bus.

The ISL link provided by the interface 203 may be an Ethernet-based ISL link. In an Ethernet-based ISL link implementation, the ISL physical interface 203 can be an Ethernet network interface card providing a 100 BaseTX physical layer interface to another ISL capable device. ISL frames in an Ethernet-based implementation (referred to herein as an "Ethernet-based ISL frame") are based on the Ethernet frame format. Ethernet frame formats are further described in ANSI/IEEE Standard 802.3, *CSMA/CD Access Method and Physical Layer Specifications*, and in related ANSI/IEEE standards. An Ethernet-based ISL frame includes header, payload, and trailer fields. The ISL frame header may include both conventional Ethernet frame fields as well as ISL-specific field information; the ISL frame payload encapsulates another Ethernet or Token Ring frame, and the ISL-frame trailer includes cyclic redundancy check (CRC) or other error control data.

An Ethernet-based interface 203 may exchange both Ethernet-based ISL frames and "standard" Ethernet frames over the link 120 (FIG. 1). Ethernet-based ISL frames and standard Ethernet frames can be distinguished using destination address information in the first five bytes of the frame and by the presence of the value 0xAAAA03 (hexadecimal) in bytes fifteen through seventeen of the frame header (the AAAA03 field). For example, an ISL frame may include the broadcast destination address 0x01-00-0C-00-00 (hexadecimal) in the destination address field and the value 0xAAAA03 in bytes of the AAAA03 field.

The ISL device driver 216 can provide instructions to the ISL physical interface 203 to regulate data frame transfers between the operating system 215 and/or applications 211–214 and the ISL interface 203. When an ISL frame is received at ISL physical interface 203, an interrupt signal may be generated and sent to the device driver 216. The device driver may then obtain the received ISL frame from the interface device 203 and process the frame. Frame processing by the driver 216 may include removal of ISL header and trailer information, extraction of a native LAN frame, and the transfer of the native LAN frame to the operating system 215 or to another application 211–214.

Transfer of data between the interface device 203 and the operating system 215 may occur through a direct memory access (DMA). A DMA transfer allows data to be transferred between the ISL interface 203 and a region of memory 210 accessible by the operating system 215 or by applications 211–214. In a peripheral component interconnect (PCI) implementation, a PCI-based ISL interface 203 supporting DMA can transfer data across a PCI bus 206 to memory 210 independent of the processor 201.

In general, devices performing DMA transfers include their own processing or bus interface circuitry to perform the DMA transfer and, therefore, require little or no supplementary assistance by the processor 201 during data transfers. During a data transfer by a DMA-capable ISL interface 203, the processor 201 may perform other tasks such as execution of application programs 211–214. In contrast, in a non-DMA data transfer, the processor 201 may be required to read data from a device and then transfer the data to a destination in memory 210. In general, prior to a DMA transfer, memory descriptor data will be transferred to the DMA capable device to identify a memory region to which the device can transfer data. Prior to a DMA transfer by a DMA-capable ISL interface 203, the processor 201 executes operating system 215 and/or device driver 216 code to identify a region in memory 210 into which data can be transferred. The identified region can be, for example, a data buffer in a network protocol processing sub-section 219 of the operating system 215.

When an ISL frame is received by the ISL interface 203, the interface 203 may use a DMA transfer to provide the frame directly to the operating system 215. Using a DMA transfer, the interface 203 can transfer the frame directly to a network protocol 219 buffer for further processing by the network protocols 219. The operating system 215 and/or one of its sub-components, such as the network protocols 219, may expect the ISL frame to have a consistent format in which encapsulated frames are located at a fixed offsets within the ISL frame.

Figure 3A:
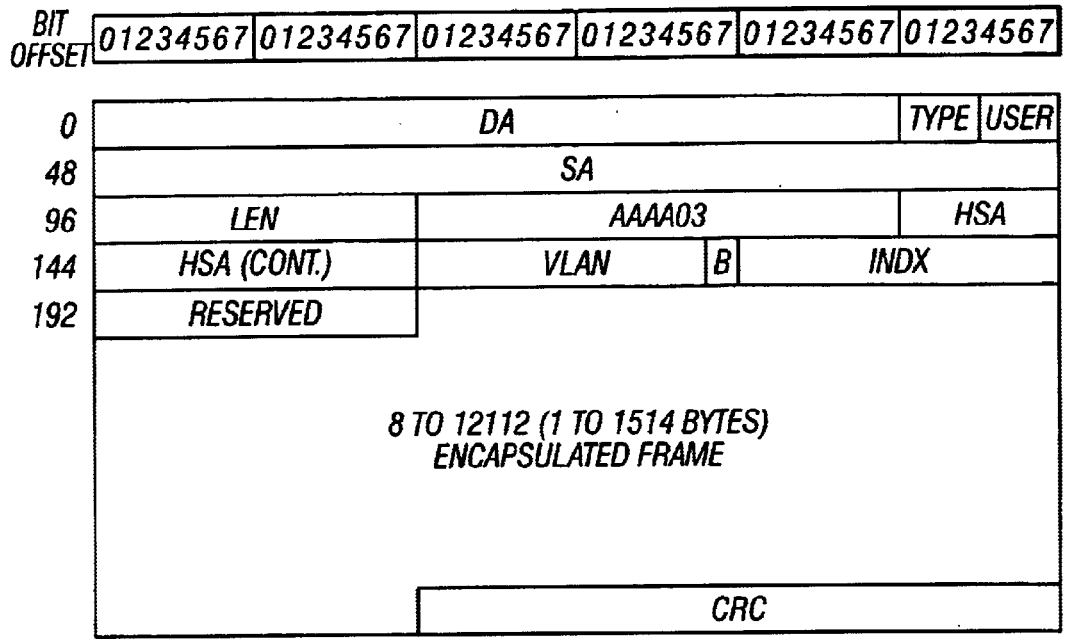
FIGS. 3A and 3B depict inter-switch link data frame headers.
Figure 3B:
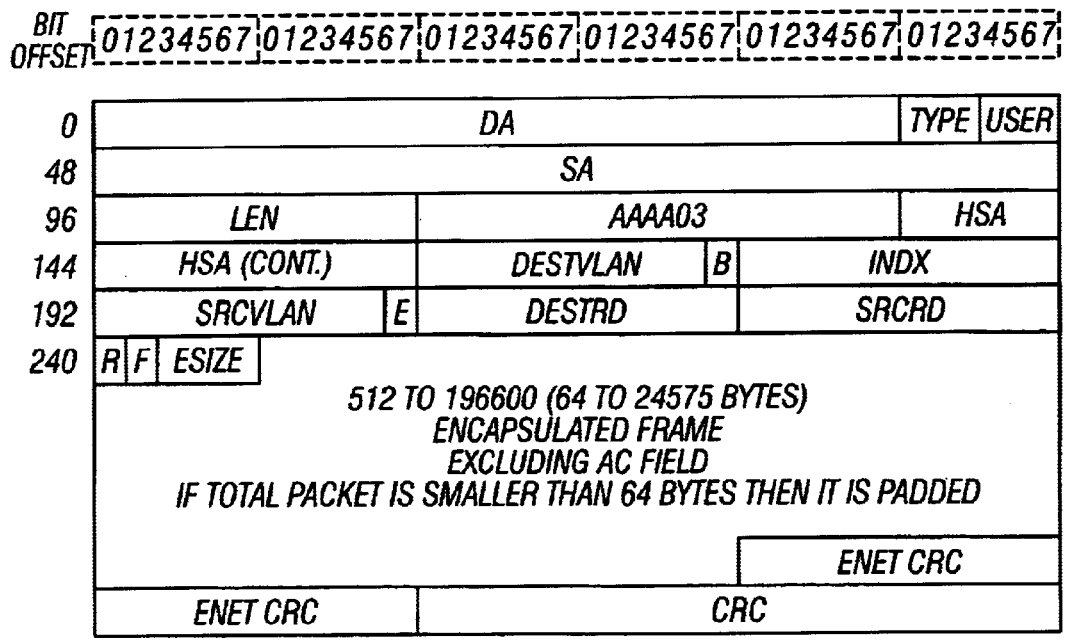

In commonly used Ethernet-based ISL frame formats, different types of LAN frames are encapsulated at different offsets within an ISL frame. FIGS. 3A and 3B show commonly used Ethernet-based ISL frame formats. Referring to FIG. 3B, when a Token Ring frame is encapsulated in an Ethernet-based ISL frame, the Token Ring frame's access control (AC) field is replaced with R/F/ESIZE data (see table below), and the modified Token Ring frame is encapsulated in an ISL frame having an additional 30 bytes of header data. Thus, the R/F/ESIZE data of the encapsulated modified Token Ring frame begins at a 31 byte offset within the ISL frame. Additional information on standard Token Ring frame formats can be found in ISO/IEC 8802-5, ANSI/IEEE Std 802.5, *Token ring access method and physical layer interface*. On the other hand, referring to FIG. 3A, when an Ethernet frame is encapsulated in an Ethernet-based ISL frame, the unmodified Ethernet frame is encapsulated in an ISL frame having a 26 byte header. Thus, the ISL frame header size for a Token Ring frame is four bytes greater than that of an Ethernet frame. Other field values within the ISL frames (FIGS. 3A and 3B) are shown in the following table:

| Field | Name/Value |
|---|---|
| DA | The DA field specifies the ISL frame's destination address. In general, this field includes a 40-bit multicast address with the hexadecimal value "0x01-00-0C-00-00". |
| Type | A 4-bit field identifying the type of encapsulated frame. Values may include:<br>"0000" - Ethernet<br>"0001" - Token-Ring<br>"0010" - FDDI<br>"0011" - ATM |
| User | User defined priority. |
| SA | Identifies the 48-bit source address of the device transmitting the ISL frame. |
| LEN | This is the length of the ISL frame excluding the DA, Type, User, SA, LEN and CRC fields. |
| AAAA03 | This is a constant with the hexadecimal value 0xAAAA03 indicating that the frame is an ISL frame. |
| HAS | Contains the upper three bytes of the source address field (the manufacturer ID portion). |
| VLAN | Identifies the virtual LAN ID of the packet. |
| B | Bridge Protocol Data Unit indicator field. This field is set for all bridge protocol data units encapsulated by the ISL packet. |
| INDX | Index field. This field may be used for diagnostic purposes. |
| ENCAPSULATED FRAME | Encapsulated frame. For Ethernet, this is the original frame. For Token-Ring, this is the original frame without the AC field |
| CRC | 32-bit Cyclic Redundancy Check |
| DESTVLAN | This is the destination virtual LAN ID. It can be either a TRNET VLAN ID or a TR VLAN ID |
| SRCVLAN | Source VLAN ID. It can be either a TRNET VLAN ID or a TR VLAN ID |
| E | Token-Ring explorer packet indicator |
| R | Reserved bit |
| F | FCS not present indicator |
| ESIZE | Size of Token-Ring frames smaller than 64 bytes, otherwise 0. The ESIZE field is the total length of the Token-Ring frame, including the AC and inner CRC field |
| DESTRD | Destination route descriptor |
| SRCRD | Source route descriptor |
| PAD | Token-Ring packets smaller than 64 bytes are padded to the minimum size an Ethernet controller can handle, namely 64 bytes |
| ENET CRC | 32-bit Cyclic Redundancy Check covering the DEST RD, SRC RD, R, F and ESIZE fields and the encapsulated Token-Ring frame |

Encapsulating native LAN frames at different offsets within an ISL frame can complicate ISL frame processing, reduce frame processing efficiency, and reduce network element 200 throughput. For example, device driver 216 may require additional processing to determine the start of the encapsulated frame. Additional device driver 216 processing may require additional processor 201 resources and may limit the overall data handling capabilities of the network element 200.

Figure 4:
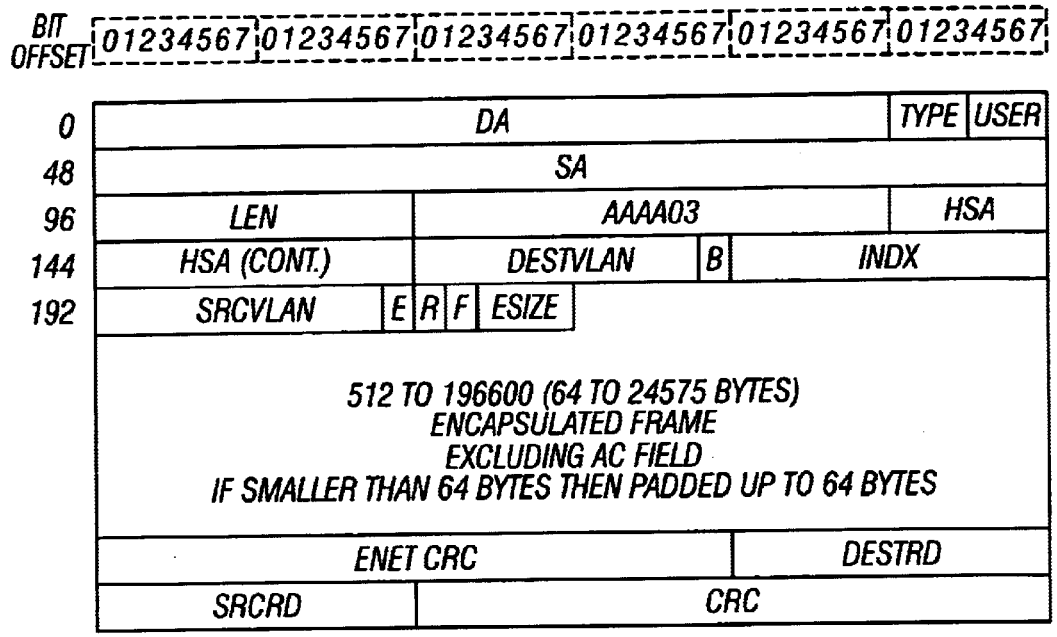
FIG. 4 depicts a modified inter-switch link data frame header.

Advantages in ISL frame processing may be obtained by passing a consistent ISL frame format between the ISL interface 203 and other network element 200 components. Shown in FIG. 4 is a modified ISL frame format that can be used to provide a consistent (native LAN-type independent) frame encapsulation offset. The modified ISL frame of FIG. 4 thereby enables a consistent frame format for transfers between the ISL interface 203 and other operating system 215 or other network element 200 components. Upon reception of an ISL encapsulated Token-Ring frame (FIG. 3B), the ISL interface 203 modifies the Token-Ring ISL frame (FIG. 3B) to conform to the modified ISL frame format (FIG. 4). To do so, the ISL interface 203 moves the DESTRD an SRCRD fields in the ISL frame of FIG. 3B so that they precede the final CRC field in the ISL frame resulting in a 26 byte ISL frame header for Token Ring frame encapsulation. This is further illustrated by comparing the original Token Ring encapsulation frame in FIG. 3B with the modified frame in FIG. 4. The resulting ISL Token Ring encapsulation frame will then have the same header length as an ISL Ethernet encapsulation frame.

Figure 5A:
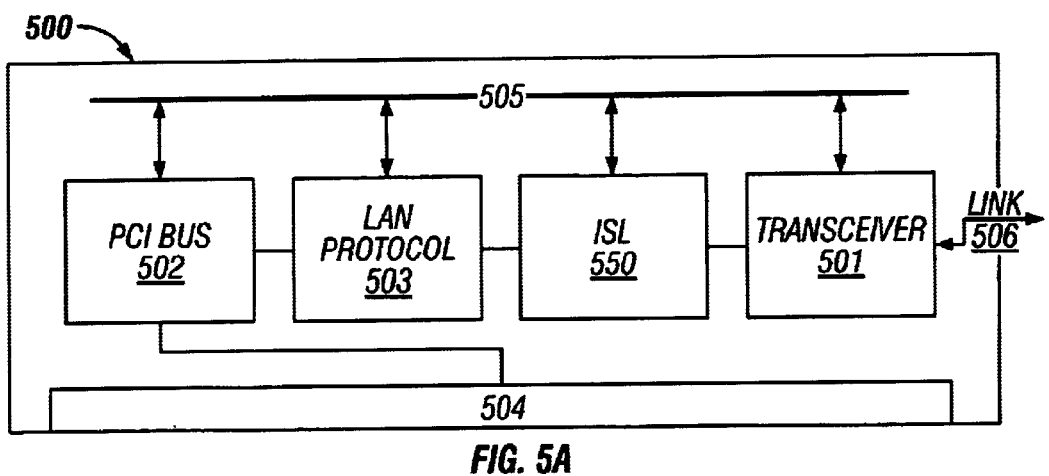
FIGS. 5A, 5B, 5C depict an interface card.

Referring to FIG. 5A, an Ethernet-based ISL link interface device 500 can rearrange header data in Ethernet-based ISL frames and thereby provide advantages in the processing of received ISL frames. The link interface 500 includes circuitry elements 501–503 and 550. Circuit elements 501–503 and 550 may be directly interconnected and/or may be interconnected by a bus 505.

The link interface 500 includes a transceiver 501 to send and receive data on a link. The transceiver 501 may be a Micro Linear ML 6692 100 BaseTX Ethernet transceiver. Different models and types of transceivers may be used. For example, a 10 BaseTX Ethernet transceiver or a gigabit Ethernet transceiver can be used. The transceiver 501 is coupled to a peripheral component interconnect (PCI) bus interface 502 through a LAN protocol processor 503 and an ISL frame processor 550. The PCI bus interface 502 provides PCI bus signal processing and exchanges signals over connector 504. The connector 504 provides both physical and electrical connection to a PCI bus. The LAN protocol processor 503 performs Ethernet carrier sense multiple access (CSMA) and access protocol processing. The ISL frame processor 504 can rearrange ISL frame header data. For example, the processor 550 can convert between the Ethernet-based ISL frames of FIG. 3B and the modified Ethernet frame of FIG. 4 by relocating DESTRD and SRCRD fields in the ISL frames.

Figure 5B:
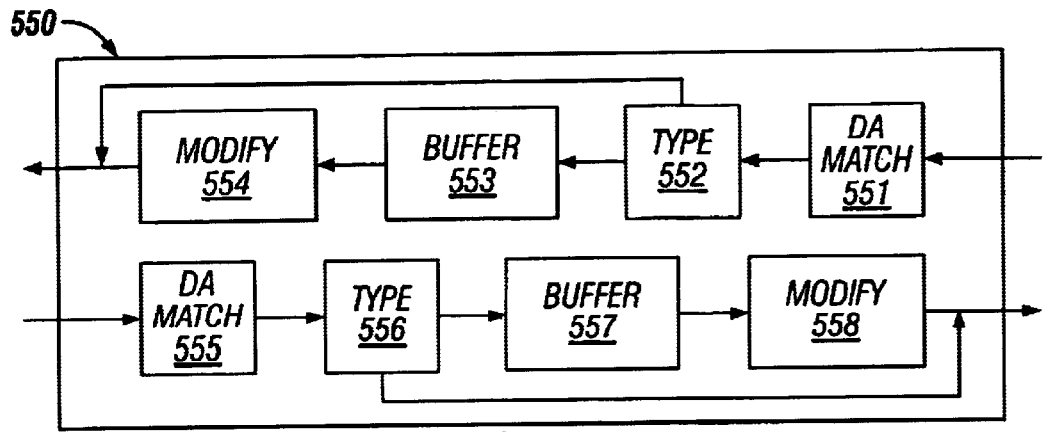

Referring to FIG. 5B, the ISL frame processor 550 includes an ISL frame detector 551. The ISL frame detector 551 receives frames from the transceiver 501 and examines the destination address in the frame. Based on the destination address and the value in the AAAA03 header field, the detector 551 determines whether the frame is an ISL frame (for example, a destination address equal to 0x01_00_0C_00_00 (hexadecimal) may identify an ISL frame if bytes fifteen through seventeen of the header have). ISL frames are further processed by encapsulated frame type detection circuitry 552. The frame type detection circuitry 552 determines whether the ISL frame includes an encapsulated Token Ring frame or an encapsulated Ethernet frame. Encapsulated Ethernet and Token Ring frames can be distinguished based on the contents of the ISL frame "TYPE" field. Non-ISL frames and ISL frames encapsulating Ethernet frames can be sent to the LAN protocol processor 503 without further processing by the ISL processor 550. On the other hand, if the frame is an ISL frame encapsulating a Token Ring frame, it will be stored in buffer memory 553 by the detector 552 and read from buffer memory 553 by the frame modification circuitry 554. Frame modification circuitry 554 reorganizes the ISL frame by moving DESTRD and SRCRD fields from to the end of the ISL frame (as seen by comparing FIGS. 3B and 4). Modification circuitry 554 may also include cyclic redundancy check (CRC) calculation circuitry to calculate a new CRC value to be placed in the CRC field at the end of the ISL frame (FIG. 4).

ISL frames also may be received at the device 500 from the PCI bus interface 502 and/or LAN protocol processor 503 for transmission on the link 506. When an ISL frame is received from the PCI bus by bus controller 502, circuitry 555 determines whether the frame is an ISL frame by examining the frames destination address and circuitry 556 determines whether an encapsulated Token Ring frame is being transported. If the frame is an ISL frame encapsulating a Token Ring frame, the DESTRD and SRCRD fields at the end of the ISL frame (FIG. 4) are moved to their "standard" positions at bytes 27–30 of the ISL frame (FIG. 3B) by buffer 557 and modification 558 circuitry. During modification by the circuitry 558, new CRC values may be calculated for the frame (FIG. 3B).

Figure 5C:
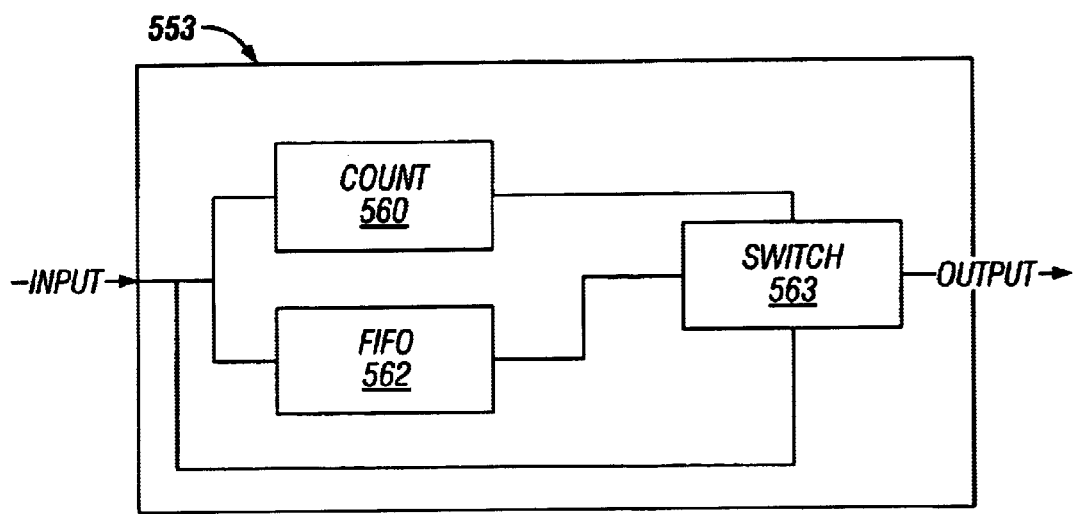

Buffers 553 and 557 need not store the entire ISL frame. For example, referring to FIG. 5C, the buffer 553 may include a four byte first-in-first-out buffer 562, a counter 560 and a switch 563. When an ISL frame is processed by the buffer 553, the switch 536 is initially set to output bytes from the FIFO 562. ISL header bytes are sequentially stored in the FIFO buffer 562 and, after a four-byte delay, are shifted out of the buffer and provided to the buffer 553 output. The counter 560 maintains a count of an ISL frame's bytes passing through the buffer 553 and, when count in the counter 560 indicates that the DESTRD and SRCRD fields are in the FIFO 562, a signals are sent to the switch 563 to output bytes directly from the buffer 553 input and to the FIFO 562 to prevent further input to the FIFO 562. The buffer 558 will continue to directly output the input data until after the encapsulated frame is fully output (as determined by a counter circuitry 560), at which point the switch 563 will again be set to output bytes from the FIFO 562 and the 562 will then output the stored DESTRD and SRCRD data followed by any additional ISL frame trailer fields. Buffer 557 may include a similar implementation.

ISL interface device implementations may include additional or alternate circuitry from that shown in FIGS. 5A and 5B. For example, the LAN protocol processor 503 and transceiver 501 may be combined in a circuit that performs both LAN protocol processing and physical layer functions. In an implementation combining transceiver 501 and processor 503, LAN protocol processing may precede header modification by ISL circuitry 550 when a frame is received on link 506, and would follow header modification when a frame is to be sent on the ISL link 506. In some implementations, frames may be modified in the ISL link interface 506 to PCI interface 504 direction, but not in the PCI interface 504 to ISL interface 506 direction.

The invention may be implemented using digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

What is claimed is:

1. An article comprising a machine-readable medium embodying information indicative of instructions that when performed by one or more machines result in operations comprising:
   receiving a frame on a communications link, the frame comprising a header and a payload; and
   forming a new frame when the payload comprises an encapsulated frame, said forming comprising modifying the header by removing a data field from the header to form a modified header and modifying a trailer following the payload by adding the data field removed from the header, the new frame comprising the modified header and the payload.

2. The article of claim 1, wherein the trailer comprises error control data and wherein forming the new frame further comprises calculating new error control data for the modified trailer based on modified components of the new frame.

3. The article of claim 2, wherein a plurality of different encapsulated frame types exist and wherein the new frame is formed selectively depending on the received encapsulated frame type.

4. The article of claim 3, wherein the plurality of encapsulated frame types comprise a Token Ring frame type and an Ethernet frame type, and wherein the new frame is formed for the Token Ring frame type and no new frame is formed for the Ethernet frame type.

5. An article comprising a machine-readable medium embodying information indicative of instructions that when performed by one or more machines result in operations comprising;
   receiving a frame on a bus interface, the frame comprising a header, a payload, and a trailer;
   forming a modified frame when the payload of the received frame comprises an encapsulated frame, said toning comprising modifying the header by adding a data field from the trailer to the header to form a modified header, the modified frame comprising the modified header and the payload; and
   transmitting the modified frame on a link interface.

6. The article of claim 5, wherein forming the modified frame further comprises removing the data field from the trailer.

7. The article of claim 6, wherein the trailer comprises a second data field and the modified header omits the second data field.

8. The article of claim 5, wherein a plurality of different encapsulated frame types exist and wherein the new frame is formed selectively depending on the received encapsulated frame type.

9. A data transmitting and receiving device comprising:
   a transceiver operatively coupled to receive data frames from a communication link, the data frames comprising a header field and a payload field;
   frame type circuitry coupled to the transceiver, the frame type circuitry comprising circuitry to determine when a payload field of a received data frame includes an encapsulated frame; and frame modification circuitry operatively coupled to the transceiver and to the frame type circuitry, the frame modification circuitry comprising circuitry to modify a header field of a data frame by removing data from the header field and adding, the removed header data to a trailer following a payload in the data frame when the frame type circuitry determines that the payload field of the data frame includes an encapsulated frame.

10. The device of claim 9, wherein the trailer comprises error control data, and the circuitry to modify the header field further comprises circuitry that calculates new error control data for the trailer.

11. A data transmitting and receiving device comprising:
a transceiver operatively coupled to receive data frames from a communication link, the data frames comprising a header field and a payload field;
frame type circuitry coupled to the transceiver, the frame type circuitry comprising circuitry to determine when a payload field of a received data frame includes an encapsulated frame; and
frame modification circuitry operatively coupled to the transceiver and to the frame type circuitry, the frame modification circuitry comprising circuitry to modify a header field of a data frame by adding data from a trailer of the data frame to the header field of the data frame.

12. The device of claim 11, wherein the circuitry to modify the header field further comprises circuitry that removes from the trailer the data added to the header field.

13. The device of claim 9, wherein the type circuitry comprises comparison circuitry to compare selected bytes in a data frame's header field to predetermined values.

14. The device of claim 9, further comprising bus interface circuitry operatively coupling the device to a peripheral bus to transmit and receive data on the peripheral bus.

15. The device of claim 14, wherein the bus interface circuitry comprises peripheral component interconnect (PCI) circuitry and the bus is a PCI bus.

16. The device of claim 14, wherein the bus interface circuitry further comprises direct memory access (DMA) circuitry to perform direct memory access data transfer over the bus.

17. The device of claim 9, further comprising a butter to store at least a portion of the data frames, the buffer comprising a first-in-first-out buffer, a counter, and a switch.

18. The device of claim 11, wherein the type circuitry comprises comparison circuitry to compare selected bytes in a data frame's header field to predetermined values.

19. The device of claim 11, further comprising bus interface circuitry operatively coupling the device to a peripheral bus to transmit and receive data on the peripheral bus.

20. The device of claim 19, wherein the bus interface circuitry comprises peripheral component interconnect (PCI) circuitry and the bus is a PCI bus.

21. The device of claim 19, wherein the bus interface circuitry further comprises direct memory access (DMA) circuitry to perform direct memory access data transfer over the bus.

22. The device of claim 11, further comprising a buffer to store at least a portion of the data frames, the buffer comprising a first-in-first-out buffer, a counter, and a switch.

23. A system comprising:
a transceiver operatively coupled to receive data frames from a communication link, the data frames comprising a header field and a payload field;
frame type circuitry coupled to the transceiver, the frame type circuitry comprising circuitry to determine when a payload field of a received data frame includes an encapsulated frame;
frame modification circuitry operatively coupled to the transceiver and to the frame type circuitry, the frame modification circuitry comprising circuitry to modify a header field of a data frame by removing data from the header field and adding the removed header data to a trailer following a payload in the data frame when the frame type circuitry determines that the payload field of the data frame includes an encapsulated frame; and
direct memory access (DMA) circuitry to perform direct memory access data transfer over a bus.

24. The system of claim 23, wherein the trailer comprises error control data, and the circuitry to modify the header field further comprises circuitry that calculates new error control data for the trailer.

25. A system comprising:
a transceiver operatively coupled to receive data frames from a communication link, the data frames comprising a header field and a payload field;
frame type circuitry coupled to the transceiver, the frame type circuitry comprising circuitry to determine when a payload field of a received data frame includes an encapsulated frame;
frame modification circuitry operatively coupled to the transceiver and to the frame type circuitry, the frame modification circuitry comprising circuitry to modify a header field of a data frame by adding data from a trailer of the data frame to the header field of the data frame; and
direct memory access (DMA) circuitry to perform direct memory access data transfer over a bus.

26. The system of claim 25, wherein the circuitry to modify the header field further comprises circuitry that removes from the trailer the data added to the header field.

* * * * *